Aug. 21, 1962 SHIGETSUNE IIKURA 3,050,270

REEL APPARATUS

Filed Sept. 16, 1959 2 Sheets-Sheet 1

Inventor
Shigetsune Iikura
by Hill, Sherman, Meroni, Gross & Simpson Attys.

Aug. 21, 1962 SHIGETSUNE IIKURA 3,050,270

REEL APPARATUS

Filed Sept. 16, 1959 2 Sheets-Sheet 2

Inventor
Shigetsune Iikura
by Hill, Sherman, Meroni, Gross & Simpson Attys.

3,050,270
REEL APPARATUS

Shigetsune Iikura, Tokyo, Japan, assignor to Sony Corporation, Tokyo, Japan, a corporation of Japan Filed Sept. 16, 1959, Ser. No. 840,282
4 Claims. (Cl. 242—71.8)

This invention relates to a reel apparatus and more particularly to such a reel or reel apparatus for taking up or supplying a carrier such as a movie film or a magnetic recording tape.

The present application is a continuation-in-part of my copending application U.S. Serial No. 782,769, filed December 24, 1958.

In the copending U.S. Serial No. 782,769, I have proposed a reel apparatus which is disposed with a certain inclination or depression angle with respect to the vertical plane so that the taking-up or supply of a carrier such as a movie film or a magnetic recording tape can easily be attained without rewinding. This invention intends to obtain an improved reel apparatus in connection with that disclosed in the copending application.

An object of this invention is to provide an improved reel apparatus in which a carrier can be easily picked out through a window formed on a side plate of the reel and supplied naturally to a cooperating reel without giving any appreciable torsion of the carrier and without guide rollers.

Another object of this invention is to provide a simple reel in which an endless carrier can be drawn out from the inside of the reel through a window formed on a side plate of the reel and supplied again to the outside of the same reel.

A further object of this invention is to provide a reel apparatus in which a user of the reel apparatus can easily operate the supply and take up of an ordinary film of a usual movie projector and of a magnetic tape of a usual magnetic recorder without any special accessory.

Other objects, features and advantages of this invention will be more apparent from the following detailed description taken in connection with the accompanying drawing in which.

Figure 1:
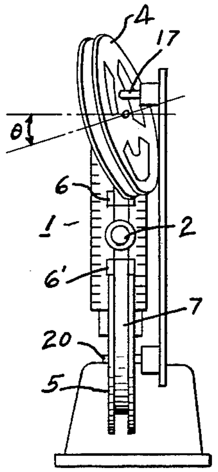
FIGURE 1 is a front view of a movie projector to which a reel apparatus according to this invention is applied.
Figure 2:
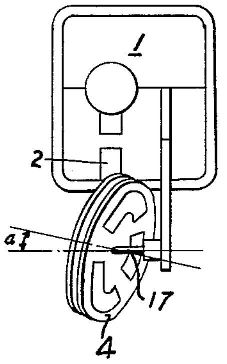
FIGURE 2 is a plan view of the movie projector shown in FIGURE 1.
Figure 3:
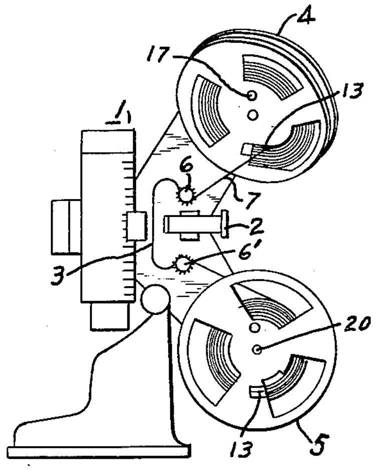
FIGURE 3 is a side view of the movie projector shown in FIGURE 1.

Referring to FIGURES 1, 2 and 3 of the drawing, 1 represents generally a movie projector. 2 designates a lens system. 3 is a loop of film in front of a lens, 4 a supply reel and 5 a take up reel, 6 and 6' are sprocket wheels and 7 a movie film or a carrier.

Figure 4:
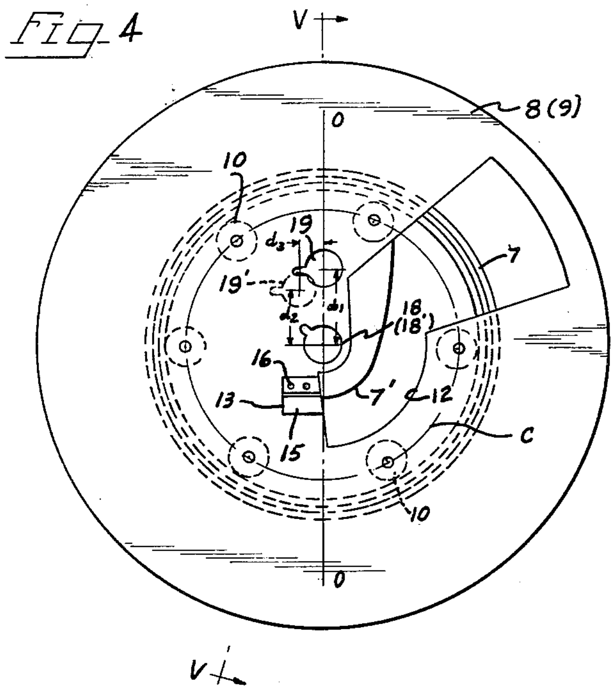
FIGURE 4 is a front view of a reel embodying this invention.
Figure 5:
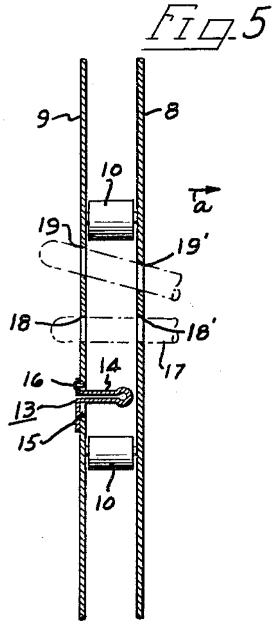
FIGURE 5 is a sectional side view of the reel taken along the line V—V of FIGURE 4.

In accordance with this invention at least one of said reels, for example the upper reel 4 is constructed specially as shown in FIGURES 4 and 5. That is, the reel 4 has a pair of oppositely disposed side plates 8 and 9 for restricting the side edges of the carrier 7 and a plurality of rollers 10 arranged on a concentric circle *c* between the side plates so that the carrier 7 is wound on the outer sides of the rollers.

In order to pick out the inner end 7' of the carrier 7 which is wound inside the reel a window 12 is formed on at least one of the side plates along substantially the travel direction of the carrier.

At the inner end of the window 12 is mounted a carrier holder 13 which has a mouth to be opened to the outside of the side plate so that the inner end 7' of the carrier 7 is transversely put into the carrier holder 13. The carrier holder 13 is made by bending a resilient band such as a thin plate made of plastics or metal plate in the form of U-shape, which U-shaped piece, in turn, is put into a slit 15 communicated to the inner end of the window 12, one end of the U-shaped piece being secured to the inner side edge of the slit by means of a screw 16 and the other end of the U-shaped piece being free so as to close its mouth naturally owing to its resilience.

The inner free end of the carrier is transversely caught by the mouth formed by the both ends of the U-shaped piece. It is preferable that the inner walls of the mouth of the carrier holder are made of rough surface so that the end of the carrier is accurately engaged with the rough surfaces.

The window 12 may have a width large enough to insert fingers to pick up the end of the carrier but the width may be lesser than this, if desired.

The carrier holder is not always constructed as shown in the drawing, but any desired construction can be used.

Figure 6:
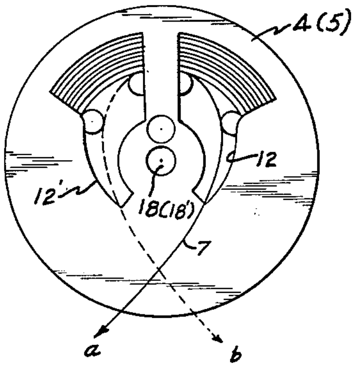
FIGURE 6 is a schematic diagram of a reel according to this invention illustrating the relationship between a shape of a window and the carrier supplying direction therethrough.
Figure 7:
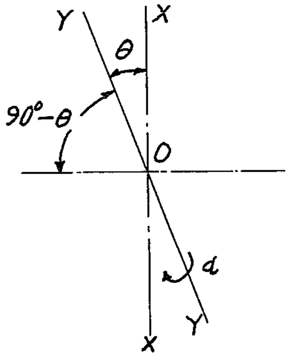
FIGURE 7 is a diagram for illustrating the inclination or depression angle and the torsional angle of a reel according to this invention.

It is preferable that the window 12 is extended to the direction to which the carrier 7 is picked up. That is, in the case of a supply reel of a movie projector, a film is usually supplied from the right hand with respect to the central aperture 18 as shown by the full line arrow *a*, in FIGURE 6, so that the window 12 is preferably formed along the supply direction of the film, while in the case of a supply reel of a magnetic recorder, a tape is usually supplied from the left hand with respect to the central aperture 18 as shown by the dotted line arrow *b* so that the window 12' is preferably formed along the supply direction of the tape.

It is, therefore, apparent that a reel having both the windows 12 and 12' can be used as a combined film supply and tape supply reel.

In accordance with this invention, means for setting a reel are provided, in such a way that the reel is, disposed on the YY-plane by inclining it by a desired depression angle $\theta$ with respect to a vertical XX-plane and fixed at the position rotated by torsional angle $\pm\alpha$ from the YY-plane along the supply direction of the carrier, as understood from FIGURES 2 to 7, inclusive.

In an example shown in FIGURES 1 to 5, inclusive, especially as clearly shown in FIGURES 4 and 5, besides that the side plates 8 and 9 of the reel have respectively central apertures 18 and 18' which are aligned with each other for receiving a shaft 17', the side plate 8 is provided with an aperture 19 which is positioned displaced from the central aperture 18 by the distance $d_1$ on the vertical line 0—0 passing through the central aperture, from and above the central aperture 18, and the side plate 9 is provided with another aperture 19' which is displaced from the central aperture 18' by the distance $d_2$ being shorter than the distance $d_1$, from the central aperture and displaced by the distance $d_3$, from the line 0—0. It will be noted that the difference between the distances $d_1$ and $d_2$ enables to incline the reel by the depression, angle $\theta$ and the distance $d_3$ affords the torsional angle $\alpha$ to the reel.

The reel shown in FIGURES 1 to 3, inclusive, is disposed with such depression angle $\theta$ and torsional angle $\alpha$. It will be understood that the reel is adapted to supply the carrier downwardly owing to the depression angle $\theta$ and along the direction of the arrow *a* leftwardly owing to the torsional angle $\alpha$, as shown in FIGURE 3, whereby the carrier or the film of the movie projector can be supplied from the inside of the reel toward the left and downward direction without any appreciable torsion.

Now I will explain the operation of the reel or reel apparatus according to this invention applied to a movie projector. The inner end 7' of a film is picked up and drawn out by fingers through the window 12 of the upper supply reel 4. In this case the film 7 can be supplied with the depression angle $\theta$ and the torsional angle $\alpha$ from the reel 4 to the lower take up reel 5. Accordingly, it will be noted in this case that the reel 4 almost stands still and a series of rollers 10 is rotated with the movement of the carrier 7 and that the travel of the film 7 from reels 4 to 5 will be accurately and smoothly performed without any torsion which will have been encountered in an ordinary reel apparatus in case of the lack of an adequate guide roller arrangement. It will also be noted that the lower reel 5 is set perpendicularly by engaging the axis 20 with the central apertures 18 and 18' which are aligned with each other and the film is wound freely and smoothly on the lower reel 5 from its outside. Then the inner end of the wound film is pulled out by fingers through the window 12 and put transversely into the mouth of the carrier holder or clip as shown and illustrated in FIGURE 4. Thereafter the film is continuously taken up onto the outer sides of the rollers 10 so as to pile layers spirally thereon, as an ordinary reel.

Now, the take up reel 5 thus operated is set on the axis 17 with the depression angle $\theta$ and the torsional angle $\alpha$ instead of the reel 4, then the film is pulled out and then fed from the reel 4 to another reel set on the lower axis 20 in substantially the same manner hereinbefore described so that the film is used for reprojection without repeating rewinding.

The supply operation of the film can be smoothly done without resistance owing to the roller arrangement 10. Moreover, it will be recognized that the film also travels without damage between supply and take up reels. Besides, according to this invention since the reel can be set with the depression angle $\theta$ and the torsional angle $\alpha$ by means of the discrepant apertures 19 and 19' the pull out operation of the film can be done more easily and smoothly with less torsion of the carrier as compared with a reel which is disposed only with the depression angle. The lower edge of the side plate 9 of an inclined reel touches with the supporting parts of the movie projector and the reel is supported at its best position to the supply action owing to the discrepant aperture 19 and 19' so that the reel is controlled by the brake action of the contact and by stabilizing action of the status of the best position so as to restrain swinging of the reel.

It will be appreciated that a reel according to this invention can be used in the same manner as an ordinary reel. It will also be understood that an ordinary reel which can be used as the lower reel 5 may be cooperated with the reel 4 according to this invention.

It will be noted that only one reel as shown in FIGURES 4 and 5 can be used for operating an endless carrier. Namely, the inner end of the carrier which is pulled out through the window 12 from the inner side of the reel can be supplied to and laid on the outer surface of the same carrier which is wound on the same reel so that an endless operation can be continued.

Although I have mainly explained the reel according to this invention in connection with an application for a movie projector, it will equally be adapted for the supply and take up of a magnetic tape used in a magnetic recorder.

Figure 8:
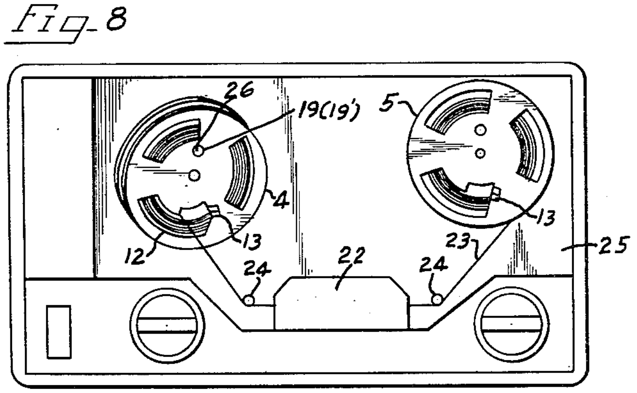
FIGURE 8 shows a plan view of a magnetic tape recorder to which a reel according to this invention is applied.

FIGURE 8 shows a magnetic recorder to which the reel apparatus according to this invention is adapted. 21 shows a generally magnetic recorder. 4 is a supply reel, 5 is a take up reel. 22 illustrates a magnetic head cover and 23 a magnetic tape. 24 designates guide rollers of the tape. In this case although a panel 25 on which both the reels 4 and 5 are attached is disposed in the horizontal plane the supply reel 4 is supported at the status inclined towards the operator by a depression angle $\theta$ and inwardly by a torsional angle $\alpha$ with respect to the horizontal plane by inserting a vertical axis 26 to the eccentric and discrepant apertures 19 and 19'. The inner end of the tape 23 is pulled out through the window 12 of the supply reel 4 and travels along the magnetic head 22 and wound into the take up reel 5. In this example the supply and take up operation of the magnetic tape will be easily and smoothly performed owing to the depression angle $\theta$ and torsional angle $\alpha$ of the reel 4 even if the tape is pulled out from the center portion of the reel, as has been already hereinbefore referred to. After a record is thus done, for example, the reproducing can easily be completed by only changing the positions of the supply reel 4 and the take up reel 5, the magnetic tape being picked up from the center portion of the reel which is now set as the supply side without rewind, as already explained. If the window is formed not only on the side plate 8 but also on the opposite side plate 9 a second sound track of the same magnetic tape can be used for both recording and reproducing without rewinding when the reels are turned over for the same operation as above referred to. It will be easily understood in a magnetic recorder than an endless operation of a magnetic tape may be continued by the use of only one reel according to this invention, as has been described in connection with the movie projector.

The features and advantages of this invention which have been already explained in connection with a movie projector are equally obtained in applying to a magnetic recorder.

Figure 9:
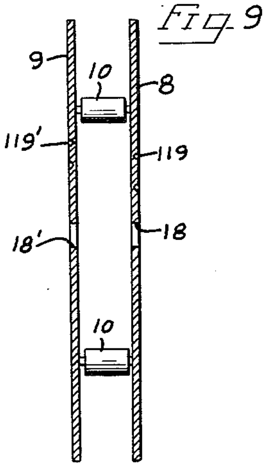
FIGURE 9 is a sectional side view of a modified construction of a reel according to this invention.

It will be understood that the means for affording the depression angle $\theta$ and torsional angle $\alpha$ to the reel according to this invention can be embodied in various forms of modifications. For example, a pair of independent discs having respectively the central apertures 18 and 18' and discrepant apertures 19 and 19' is provided and the discs can be attached to the side plates of a reel, as desired. These discs can also be adjustably attached to the side plates. FIGURE 9 shows a sectional side view of a modified reel according to this invention in which a pair of ring grooves 119 and 119' are respectively formed corresponding to the positions of the apertures 19 and 19' on the side plates and new corresponding discrepant apertures 19 and 19' may be formed by removing the parts surrounded by the ring grooves 119 and 119' when the parts are pressed by a user.

The side plates 8 and 9 are bridged by a tube instead of forming the apertures 19 and 19' through which an axis passes. The construction can be so made that the angle of the tube with respect to the side plates can be adjusted. It will be also possible to attach such a tube on the outer side of one of the side plates so as to hold a reel by inserting an axis to the tube.

In some cases a pair of discs having a tube corresponding to the apertures 19 and 19' may adjustably be mounted to the side plates and the depression angle $\theta$ and the torsional angle of the reel can be changed as desired, by adjusting the position of the discs.

Figure 10:
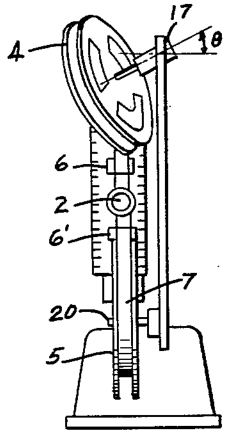
FIGURE 10 shows a front view of another type of a movie projector to which a reel is applied according to this invention.

Although the movie projector, the reel axis of which is directed along the horizontal plane has been explained, desired depression angle $\theta$ and torsional angle $\alpha$ can also be given to a reel if an axis 17' of a movie projector is constructed to be rotated and then set at the desired rotated position, as shown in FIGURE 10.

It will be understood that the depression angle $\theta$ and the torsional angle $\alpha$ can also be realized by inclining an axis bracket or a movie projector itself.

Moreover, instead of a series of guide rollers 10, other forms of rotating parts can be located on the inner side of the side plates or the side plates themselves may be formed as the rotating parts.

It will be apparent that the contour and form of the reel side plates and the rotating parts can be adequately selected corresponding to the kind and character of the carrier to be used.

In operation each of the reels are mounted on a support shaft with the axis of the reel coaxial with the axis of the support shaft when a carrier is to be wound on the reel in a normal manner with the layers of the carrier building up outwardly. This is shown, for example, by the lower reel receiving the carrier 7 and mounted on the projectors of FIGURES 1 and 2, being mounted on a support shaft 20. The reels are mounted on a support shaft with their axis at an angle to the axis of the support shaft by a depression angle $\theta$ and a torsional angle $\alpha$ as illustrated in FIGURES 1 and 3 by the reel 4 mounted on the support shaft 17. The improved structural and functional features provided obtain smoother and more uniform winding and unwinding functions and provide a reel which is simple and inexpensive to manufacture and merchandise. The reel is simple and easy to use and is well adapted to alternative use for movie projectors or tape recorders or is adapted to other uses wherein the features of the invention may be utilized.

Thus it will be seen that I have provided an improved reel apparatus which meets the objectives and advantages hereinbefore set forth and which provides improvements over reels of the types heretofore used.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A reel comprising a pair of oppositely disposed side plates for restricting the side edges of a carrier, said plates disposed at right angles to a central first reel axis, at least one of said side plates being provided with a window positioned radially of the center of the plate and through which the inner end of the carrier wound on the reel can be pulled out, first means on the plates for supporting the reel on a shaft coaxial with said first axis, second means on the plates for supporting the reel on a shaft on a second reel axis having an angle with respect to said first reel axis, said second means being in a position so that the reel is inclined by a desired depression angle with respect to a vertical plane with said window facing downwardly and so that the reel is rotated about a horizontal axis by a desired torsional angle toward the direction in which the carrier is withdrawn from the reel when said second axis is horizontal.

2. A reel comprising a pair of oppositely disposed side plates for restricting the side edges of the carrier, at least one of said side plates being provided with a window positioned radially of the center of the plate and through which the inner end of the carrier wound on the reel can be pulled out, central apertures in the side plates aligned with each other and located on a first axis at right angles to the plates, one of said side plates having an aperture radially displaced at a certain distance from the central aperture and the other of said side plates having another aperture radially displaced from the central aperture, said apertures being misaligned with respect to each other and being on a second axis extending at an angle to said first axis with said second axis positioned so that the reel is set in a depression angle with respect to a vertical plane with the window facing downwardly and is rotated about a horizontal axis by a torsional angle toward the pulled out direction of the carrier when a horizontal axis passes through the center of said apertures.

3. A reel comprising a pair of oppositely disposed side plates for restricting the side edges of a carrier, said side plates lying in planes perpendicular to a central axis of the reel, at least one of said side plates being provided with a window located radially of the axial center of the plate so that the inner end of the carrier wound on the reel can be pulled through the window, and said side plates each provided with a shaft receiving aperture for mounting on a horizontal shaft, said apertures being misaligned with respect to each other to be positioned on a second axis at an angle to the central axis of the reel, said apertures positioned so that the reel plates are at an angle with a vertical plane at right angles to said second axis, said apertures positioned so that the reel plates are in a plane tilted forwardly about a vertical axis passing through said second axis, when the reel is supported on a horizontal shaft passing through said shaft receiving apertures.

4. A reel comprising a pair of oppositely disposed side plates for restricting the side edges of a film, said side plates at right angles to a central first axis of the reel, at least one of said side plates being provided with a window which is positioned radially of the center of the side plate and which has a width wide enough so that the inner end of the film wound on the reel can be pulled out through the window, and each of said side plates provided with shaft receiving aperture means of a size for supportingly receiving a shaft, each of which is misaligned with respect to the other to be positioned on a second axis extending at an angle to said central axis, said aperture means located so that the reel is positioned at a depression angle tilted with respect to a vertical plane at right angles to the second axis so that the window faces downwardly, and so that the reel is rotated about a horizontal axis by a torsional angle in the direction in which the carrier is withdrawn from the reel when said second axis is horizontal.

References Cited in the file of this patent

UNITED STATES PATENTS

| | | |
|---|---|---|
| 1,899,279 | Lessler | Feb. 28, 1933 |
| 2,065,575 | Gavin | Dec. 29, 1936 |
| 2,213,613 | Sassoli | Sept. 3, 1940 |
| 2,315,703 | Hirschfeld | Apr. 6, 1943 |
| 2,358,504 | Goldberg | Sept. 19, 1944 |
| 2,540,897 | Lindeman | Feb. 6, 1951 |
| 2,640,659 | Biko et al. | June 2, 1953 |
| 2,775,411 | Tellen | Dec. 25, 1956 |

FOREIGN PATENTS

| | | |
|---|---|---|
| 182,565 | Great Britain | July 6, 1922 |